US010572699B2

United States Patent
Lai et al.

(10) Patent No.: US 10,572,699 B2
(45) Date of Patent: Feb. 25, 2020

(54) PHYSICAL PORTS MANAGEMENT

(71) Applicant: HEWLETT-PACKARD DEVELOPMENT COMPANY, L.P., Spring, TX (US)

(72) Inventors: Larry Lai, Taipei (TW); Chun-Chieh Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/348,628

(22) PCT Filed: Feb. 15, 2017

(86) PCT No.: PCT/US2017/017884
§ 371 (c)(1),
(2) Date: May 9, 2019

(87) PCT Pub. No.: WO2018/151714
PCT Pub. Date: Aug. 23, 2018

(65) Prior Publication Data
US 2019/0354731 A1 Nov. 21, 2019

(51) Int. Cl.
| | |
|---|---|
| G06K 7/08 | (2006.01) |
| G06F 21/85 | (2013.01) |
| G06F 21/44 | (2013.01) |
| H01R 13/62 | (2006.01) |
| H04W 4/80 | (2018.01) |
| G06F 21/31 | (2013.01) |

(52) U.S. Cl.
CPC ........... *G06K 7/087* (2013.01); *G06F 21/316* (2013.01); *G06F 21/445* (2013.01); *G06F 21/85* (2013.01); *H01R 13/6205* (2013.01); *H04W 4/80* (2018.02); *G06F 2221/2129* (2013.01)

(58) Field of Classification Search
None
See application file for complete search history.

(56) References Cited

U.S. PATENT DOCUMENTS

| 7,311,526 B2 | 12/2007 | Rohrbach et al. | |
|---|---|---|---|
| 2014/0321810 A1* | 10/2014 | Leigh | H01R 13/641 385/71 |
| 2015/0017831 A1* | 1/2015 | Wang | H01R 13/6683 439/488 |

(Continued)

OTHER PUBLICATIONS

Kastrenakes, J., Apple is Killing off MagSafe, One of the MacBook's Best Features, Oct. 27, 2016, < http://www.theverge.com/2016/10/27/13441150/rip-magsafe-apple-macbook-pro-charging-cable-usb-c >.

*Primary Examiner* — Kristy A Haupt
(74) *Attorney, Agent, or Firm* — Lakshmikumaran & Sridharan

(57) ABSTRACT

Examples of managing connectivity to physical ports of electronic devices are described herein. In an example, presence of an external device, which is to couple to a physical port of an electronic device, may be detected. The presence of the external device within a specific distance of the electronic device may be determined based on receipt of device data from the external device. In response to the detection of the external device, an input to generate a magnetic field at the physical port may be provided to manage connectivity of a connector of the external device to the port.

15 Claims, 5 Drawing Sheets

(56) References Cited

U.S. PATENT DOCUMENTS

2015/0093922 A1    4/2015  Bosscher et al.
2016/0064854 A1    3/2016  Schooley
2016/0110536 A1*  4/2016  Rubinstein ............ G06F 21/445
                                                726/21
2016/0211609 A1    7/2016  Sorias

* cited by examiner

PHYSICAL PORTS MANAGEMENT

BACKGROUND

With the recent advances in technology, electronic devices, such as desktop computers, notebook computers, or laptops have become ubiquitous. To provided additional functionalities, the electronic devices generally include physical ports for connecting a variety of external devices, such as memory drives, headphones, speakers, Bluetooth devices, mouse and keyboards. Examples of the physical ports include a power port, a universal serial bus (USB) port, a high definition multimedia (HDMI) port, and an audio port. Generally, unrestricted access may be provided to the ports.

BRIEF DESCRIPTION OF FIGURES

The following detailed description references the drawings, wherein.

DETAILED DESCRIPTION

Figure 1:
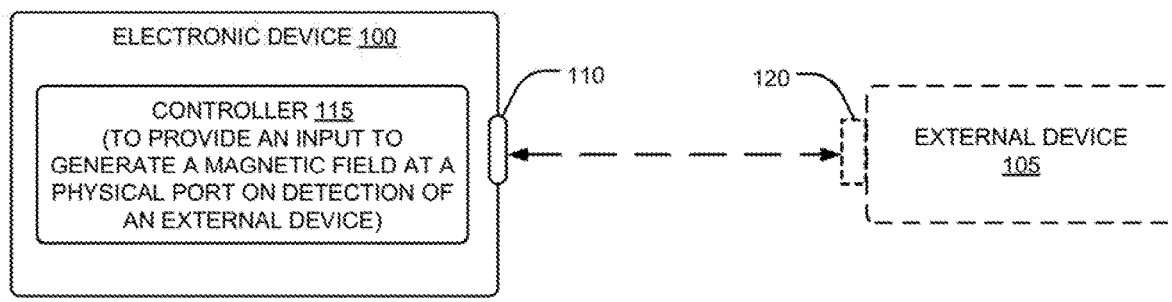
FIG. 1 illustrates an example block diagram representation of an electronic device, according to an example implementation of the present subject matter.

Electronic devices perform a variety of functions. While some of these may be performed by internal components, few others may use external devices. For instance, a mouse may be used to control a pointer on a display or an additional speaker may be used to provide enhanced audio output. Such external devices may be coupled to an electronic device via corresponding physical port, hereinafter referred to as port.

Owing to limited space, some ports may be provided at locations, which may not be conveniently accessible, such as a rear end of the electronic device, away from the view of the user of the electronic device. As a result, a user may have to adjust the electronic device to have a better view of the port while connecting the external device, which may hinder user experience. In some cases, the ports may remain unused and may not function as desired, over a period of time.

Often times, unrestricted access may be provided to the ports. Consequently, an external device having malicious content may be connected to the electronic device, thereby making the electronic device and the data contained therein susceptible to damage that may be caused by such malicious content. Still further, while connecting an external device, a user may have to specify the type of the external device, such as a headphone or a speaker, being connected, thereby affecting user experience. For example, certain ports, such as an audio input/output port, may be used to couple to various external devices, such as speakers and microphones.

Approaches to manage connectivity of external devices to ports of an electronic device are described. According to an aspect of the present subject matter, a magnetic field may be generated at the ports to facilitate connection of the electronic device with the connector of the external device. As will be appreciated, magnetic field with an attractive force may facilitate connection of the connector of the external device, while a magnetic field with a repulsive force may prevent the connector of the external device from connecting to the appropriate port of the electronic device.

In an example, the magnetic field may be generated, on detecting presence of an external device within a specified distance of the electronic device. The external device may transmit a presence signal which may be received by the electronic device. Based on the presence signal, the electronic device may determine presence of an external device in its physical proximity, i.e., within the specified distance from the electronic device.

The presence signal may be transmitted using short range communication protocol. For the purpose of explanation, the short range communication may refer to a communication, where the signals may cover a distance of a few centimeters to several meters. Examples of short range communication include, but are not limited to. Bluetooth, Near Field Communication (NFC), radio frequency identification (RFID), and infra-red communication. The presence signal may include backscatter signal, indicative of presence of the external device. In other examples, the presence signal may also include device data. The device data may include details pertaining to identity, type, authentication, or a combination thereof.

In an example, on detecting presence of the external device, a port corresponding to the external device may identified, based on the device data. Once the port for connecting the external device is identified, a magnetic field may be generated at the port. Generally, connectors of external devices are metallic and hence are attracted by a magnetic field. When within a certain distance from the port, the connector of the external device is attracted and guided to the appropriate physical port for conveniently connecting the connector to the port. It may also be the case, that the connector may also include a magnetic component or a magnet. In such cases, the magnetic field may be so generated such that it attracts the connector as well.

As would be understood, the magnetic field may guide a user to direct the connector of the external device to the port of the electronic device. Further, owing to ease in connecting the external devices, the damage to ports due to non-use or limited view may be prevented. Additionally, as the device data may be indicative of the type of the external device, a corresponding port and an associated functionality may be automatically activated without or minimum human intervention.

In another example, the connector of the external device may also include a magnet. In such a case, prior to providing access to the external device to the port, the external device may be authenticated. The authentication may be performed, based on the device data. When the external device is authenticated, the magnetic field with the attractive force may be generated at the port. On the other hand, the magnetic field with repulsive force is generated with respect to the connector, when the external device is not authenticated, thereby preventing unauthorized access or damage to the electronic device or data stored thereon.

The present subject matter provides for managing ports of an electronic device in multiple ways. The magnetic field at the ports may make previously inconveniently placed ports, easily accessible. Further, the access to the ports may be restricted to prevent any damage to the electronic device or the data. Additionally, the present subject matter provides for enhanced security without increasing complexity or adding substantial costs. Also, the ports corresponding to the external device may be automatically identified to enhance user experience.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a block diagram of an example electronic device 100, according to an example implementation of the present subject matter. In the present figure, the components illustrated in broken lines indicate features for which no protection is being sought. The electronic device 100 may be for instance, a television, a tablet, a smart phone, a notebook, a laptop, a desktop computer, or any other electronic device with physical ports to connect to external devices, such as an external device 105. Example of external device 105, include, but are not limited to, headphones, USB devices, external storage devices, speakers, Bluetooth devices, power devices, cables, such an HDMI cable or power cable, keyboards, mouse, and other peripheral devices.

In an example, the electronic device 100 includes physical port(s) 110, hereinafter referred to as port 110, to connect to the external device(s) 105 and a controller 115 to manage connectivity to the port 110. The port 110 may serve as an interface between the electronic device 100 and other external devices 105. Further, the port 110 allows for data and/or power transfer between the electronic device 100 and the external device 105.

In operation, the external device 105 may transmit a presence signal including, for instance, device data, to connect the port 110, when in the proximity of the electronic device 100. The distance within which the presence signal is to be transmitted may be predefined and may correspond to a communication range of a short range communication protocol being used.

Accordingly, the controller 115 may detect the external device 105 in proximity, based on receipt of the device data. In response to detection, the controller 115 enables generation of a magnetic field at the port 110 which corresponds to the external device 105. For instance, the magnetic field with an attractive force may be generated at the port 110 to pull a connector 120 of the external device 105 to the port 110. The magnetic pull at the port 110 may provide ease of connection and as a result, the external device 105 may be conveniently connected to ports, which may not be easily accessible otherwise. Thus, the damage to the port 110 may be minimized or eliminated.

Figure 2:
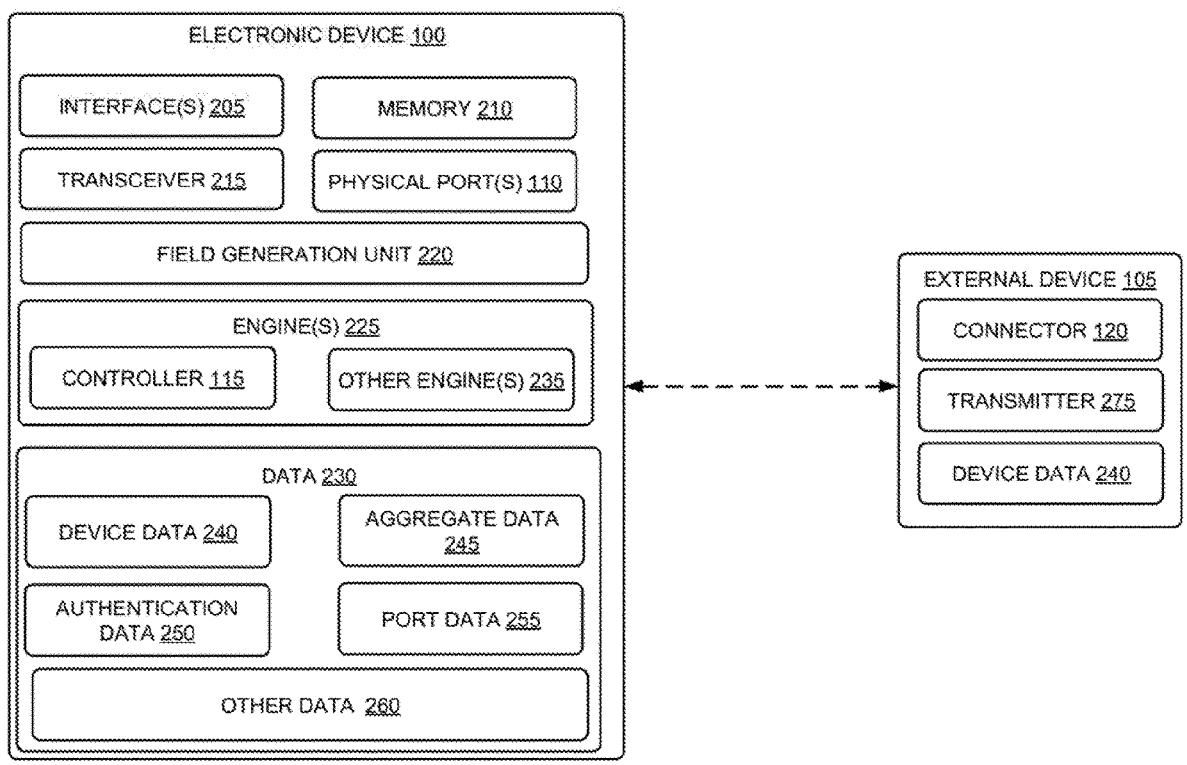
FIG. 2 illustrates various components of the electronic device, according to an example implementation of the present subject matter.

These aspects and further details are provided in conjunction with FIG. 2. FIG. 2 illustrates another block diagram of the electronic device 100, according to example implementation of the present subject matter. In the present example, the electronic device 100 may include interface(s) 205, memory 210, a transceiver 215, ports 110, a field generation unit 220, engine(s) 225, and data 230. The interface(s) 205 may include a variety of interfaces, for example, interfaces for data input and output devices, referred to as I/O devices, storage devices, network devices, and the like. The interface(s) 205 facilitate communication between the electronic device 100 and various computing devices connected in a networked environment, or also with external device 105. In an example, the interface(s) 205 includes the ports 110.

The memory 210 may store one or more computer-readable instructions, which may be fetched and executed so as to implement functionalities of the engine(s) 225. The memory 210 may be any non-transitory computer-readable medium including, for example, volatile memory such as RAM, or non-volatile memory such as EPROM, flash memory, and the like.

The electronic device 100 may further include engine(s) 225 and data 230. The engine(s) 225 may be implemented as a combination of hardware and programming (for example, programmable instructions) to implement one or more functionalities of the engine(s) 225. In examples described herein, such combinations of hardware and programming may be implemented in a number of different ways. For example, the programming for the engine(s) 225 may be processor executable instructions stored on a non-transitory machine-readable storage medium and the hardware for the engine(s) 225 may include a processing resource (for example, one or more processors), to execute such instructions. In the present examples, the machine-readable storage medium may store instructions that, when executed by the processing resource, implement engine(s) 225. In such examples, the electronic device 100 may include the machine-readable storage medium storing the instructions and the processing resource to execute the instructions, or the machine-readable storage medium may be separate but accessible to electronic device 100 and the processing resource. In other examples, engine(s) 225 may be implemented by electronic circuitry.

In an example, the engine(s) 225 include a controller 115 and other engine(s) 235. The other engine(s) 235 may implement functionalities that supplement applications or functions performed by the electronic device 100. The data 230 includes data that is either predefined or generated as a result of the functionalities implemented by any of the engine(s) 225. In one example, the data 230 may include device data 240, aggregate data 245, authentication data 250, port data 255, other data 260, or a combination thereof.

In an example, the electronic device 100 may connect to an external device 105 through the port 110. The external device 105 may include a connector 120 to connect to the port 110, a transmitter 275 corresponding to the transceiver 215, and device data 240. The transmitter 275 and the transceiver 215 may include an antenna (not shown in figures) to receive and send signals.

According to an aspect of the present subject matter, prior to physically connecting to the port 110, the external device 105 may communicate with the electronic device 100 using a wireless network, such as a network implementing a short range communication protocol. In such a network signals may travel a few centimeters to several meters, based on a short range communication protocol being implemented. Example of short range based communication network include Bluetooth, NFC, RFID, Infrared, and Zigbee. Such communication may facilitate detection of the external device 105 in proximity of the electronic device 100 as will be explained in subsequent paragraphs.

Based on a technology being implemented, distances upto which the presence of the electronic device 100 may be detected, i.e., proximity of the electronic device 100, which may be monitored may vary. For instance, when Bluetooth is implemented, the proximity may be upto 10 m and when NFC is being used, the proximity may be upto 4 cm.

In operation, to manage the ports 110, the controller 115 may monitor the proximity of the electronic device 100 to detect presence of the external device 105. In an example, the transceiver 215 of the electronic device 100 may transmit a polling signal regularly, which may be received by the external device 105 in the proximity. On receiving the polling signal, the transmitter 275 of the external device 105 may transmit the presence signal, i.e., the device data 240. In one example, the transmitter 275 may be a passive communication component, such as an RFID transmitter or an NFC transmitter, and the external device 105 may not include an internal power source. In said example, the transmitter 275 may draw energy from field created by the transceiver 215 to transmit the device data 240. The device data 240 may be sent as a backscatter signal, which may be detected by the transceiver 215.

In another example, the external device 105 may include an on-board chip or a power source to power the transmitter 275. In said example, the transmitter 275 may transmit the device data 240 on receiving a trigger. For instance, the external device 105 may include touch sensors or motion sensors to determine that a user is holding the external device 105; and such an action may be taken as a trigger to transmit the device data 240 for connecting to the port 110. In other examples, the trigger may be a user input indicating to share the device data 240 with the transceiver 215.

The receipt of the device data 240 may be indicative of presence of the external device 105 in the proximity. Further, the device data may include details pertaining to identity of the external device 105, such as a device ID, a type of external device 105, such as a USB device, a pair of headphones, a speaker, or a keyboard, and/or authentication details.

In response to detection of the external device 105, the controller 115 may identify a port, say, the port 110 corresponding to the external device 105 using the device data 240. A mapping of each port 110 to a corresponding external device may be stored in the port data 255. Using the port data 255, the controller 115 may identify the port 110. In other examples, a user input, such as a voice command, open USB port, may indicate the port to be operated.

Upon identifying the port 110, the controller 115 may ascertain whether an access to the port 110 is restricted. Details pertaining to access rights for a port may be stored in the port data 255. In case it is ascertained that unrestricted access is provided to the port 110, the controller 115 may provide an input to the field generation unit 220 to generate a magnetic field with an attractive force at the port 110. The field generation unit 220 may include, for instance, an electromagnet(s) and a current unit. In an example, each port may have a corresponding electromagnet and a common current unit. In another example, each port may have a separate field generation unit 220.

The input from the controller 115 may trigger the current unit to pass the current through the electromagnet to generate a magnetic field to attract the connector 120 of the external device 105. In an example, the connector 120 may include a ferromagnetic, such as iron, which may be magnetize itself in the magnetic field and be attracted to the magnetic field generated at the port 110. In other example, the connector 120 may include a magnetic component, such as a permanent magnet. In said example, a magnetic pole (north or south) at the free end of the connector 120, i.e., the end which couples to the port 110 may be determined so as to generate attractive magnetic field at the port 110. For the purpose of explanation, the magnetic pole at the free end of the connector 120 may be referred to as a connector pole. For instance, if the connector pole of the connector 120 is south pole of the magnetic component in the connector 120,
the magnetic field at the port 110 may generated such that a free end of the port 110 functions as a north pole, thereby attracting the connector 120.

In an example, information pertaining to the magnetic pole at the free end of the connector 120 may be stored in the device data and/or the port data 255. For instance, the default settings may indicate that the external devices 105 may have the south pole as the connector pole. In another example, different external devices may use different magnetic poles as the connector pole. However, such information may be stored in the port data 255. In yet another example, information pertaining to pole orientation of the magnetic component in the connector 120 may be obtained from the device data 240.

Thus, based on the connector pole of the connector 120, the controller 115 may provide an input to the current unit to generate the current for producing a magnetic field with an attractive force. The attractive force at the port 110 may provide a magnetic pull to connect the connector 120 to the port 110.

Referring to a case where the port 110 may not have an open access, the controller 115 may obtain authentication details from the device data 240. The authentication details may include a digital input, such as a pin, a password, or a pattern, and/or a biometric input, such as a finger impression. The user may input the authentication details in the external device 105, every time the external device 105 is to be connected. Alternatively, such details may be input only once and may be stored in the device data 240 of the external device 105. In an example, the external device 105 may include a programmable tag, which may be include the authentication details.

The controller 115 may compare the authentication details fetched from the device data 240 with authentication information pre-stored in the authentication data 250. Based on the comparison, if the external device 105 is authenticated, the controller 115 may provide an input to the filed generation unit 220 to generate a magnetic field with the attractive force at the port 110. However, if the external device 105 is not authenticated, to prevent the external device 105 from connecting to the electronic device 100, the controller 115 may provide an input to generate the magnetic field with a repulsive force with respect to the connector 120 at the port 110. In an example, in case there are multiple ports to which the external device 105 may connect to, the repulsive magnetic field may be provided at all such multiple ports. For instance, consider a case where the electronic device may have multiple USB ports, in such a case, if a USB device is not authenticated, the repulsive magnetic field may be generated at all the USB ports.

In another example, the electronic device 100 may be coupled to other electronic devices, such as such as internet of thing (IoT) devices (not shown in figures) to obtain aggregate data 245. The aggregate data 245 may include data indicative of user behavior, user preferences, or a combination thereof. The controller 115 may use the aggregate data 245 to identify the port 110 corresponding to the external device 105. The aggregate data 245 may be predefined or gathered using data received from other devices coupled to the electronic device. For instance, a webcam associated with electronic device 100 may be monitoring a user. Based on data received from the webcam, the controller 115 may determine that the user is on video call and is holding a microphone. Accordingly, an audio input port may be identified as a port corresponding to the microphone (external device).

Thus, the present subject matter provides for ease of coupling of external devices to the electronic devices, and at the same time, the external devices, which may not be authorized to access the electronic devices, may be prevented from connecting to the electronic device 100.

Figure 3:
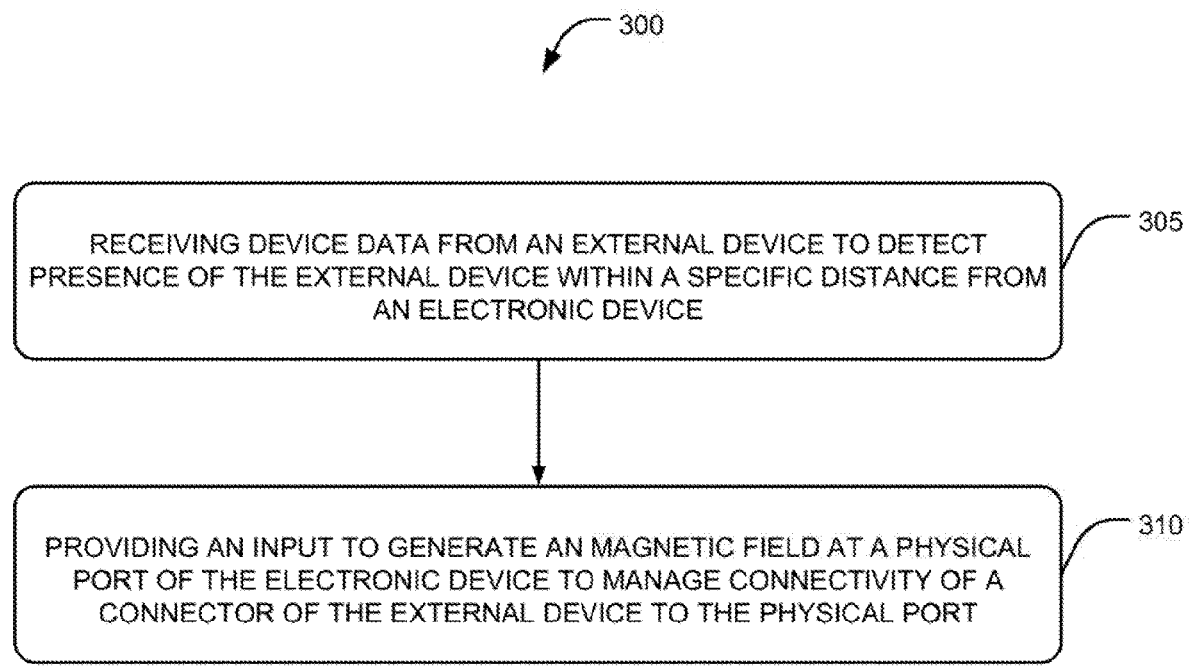
FIG. 3 illustrates a method to connect an external device to an electronic device, according to an example implementation of the present subject matter.
Figure 4:
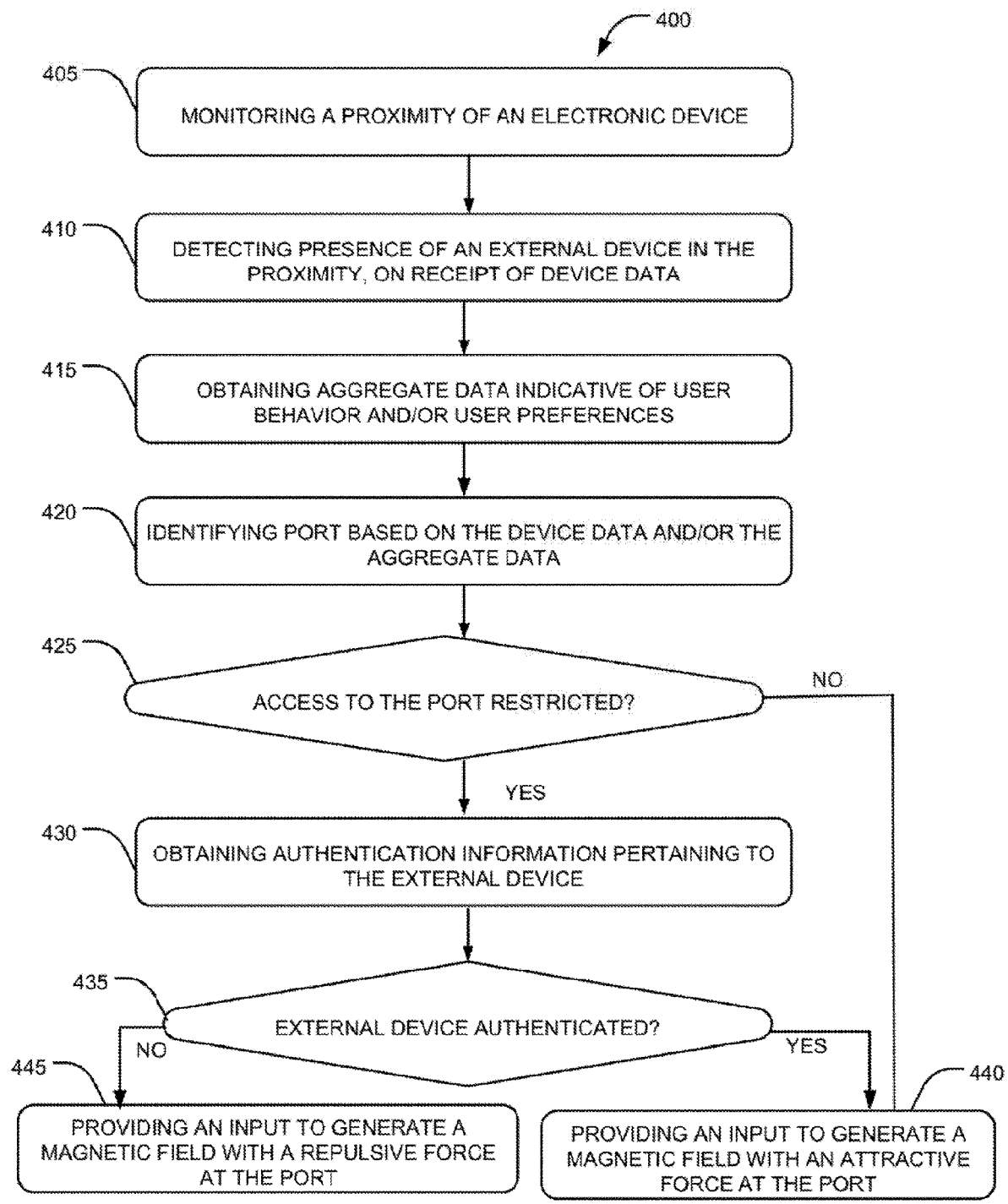
FIG. 4 illustrates a method to manage port of an electronic device, according to an example implementation of the present subject matter.

Methods 300 and 400 are described in FIG. 3 and FIG. 4, respectively, for managing connectivity to ports of an electronic device, according to an example implementation of the present subject matter. The order in which the method 400 is described is not intended to be construed as a limitation, and any number of the described method blocks can be combined in any appropriate order to execute the methods 300 and 400 or an alternative method. Additionally, individual blocks may be deleted from the method 400 without departing from the spirit and scope of the subject matter described herein.

The methods 300 and 400 can be performed by programmed computing devices, for example, based on instructions retrieved from non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

The methods 300 and 400 may be performed by a computer based system, such as the electronic device 100. For the sake of brevity of description of FIG. 3 and FIG. 4, the components of the electronic device 100 performing the various steps of the methods 300 and 400 are not described in detail with reference to FIG. 3 and FIG. 4. Such details are provided in the description provided with reference to FIGS. 1-2.

Referring to FIG. 3, at block 305, device data from an external device may be received to detect presence of the external device within specific distance from an electronic device. In an example, the controller 115 may receive the device data 240 indicative of presence of the external device 105 in proximity of the electronic device 100. For instance, the external device 105 may transmit a presence signal including the device data 240.

At block 310, in response to detection of the external device, an input may be provided to generate a magnetic field at a port to manage connectivity of the external device to the port. For instance, an attractive magnetic field may be generated at the port 110 to facilitate coupling of the connector 120 of the external device 105 to the port 110. In another example, a repulsive magnetic field may be provided to prevent the connector 120 from coupling to the port 110, in case the external device 105 is not authorized to access the electronic device.

Referring to FIG. 4, at block 405, a proximity of an electronic device, i.e., a predefined distance around the electronic device, may be monitored. In an example, the monitoring may include transmission of a polling signal. For instance, the controller 115 may monitor the proximity, where the transceiver 215 may periodically transmit the polling signal. The proximity may be monitored to detect presence of an external device. The polling signal may be transmitted over a short range communication network.

At block 410, presence of an external device, which may couple to the electronic device may be detected. The presence of the external device may be detected, based on receipt of device data from the external device. In an example, in response to polling signal or otherwise, the external device 105 may transmit a presence signal indicative presence of the external device 105. The presence signal may include the device data 240, which in turn may include details pertaining to identity of the external device, type of the external device, authentication, or a combination thereof.

At block 415, aggregate data may be obtained. The aggregate data may be indicative of user behavior, user preferences, or a combination thereof. In an example, the controller 115 may obtain aggregate data from IoT devices.

At block 420, a port corresponding to the external device may be identified. In an example, the port may be identified, based on the device data, the aggregate data, or a combination thereof. For instance, the controller 115 may identify the port, based on the device data 240 and/or the aggregate data 245.

At block 425, it is ascertained whether access to the port is restricted. In an example, the controller 115 may determine whether the access to port is restricted, based on the port data 255 including details pertaining to the ports 110. In certain example, unrestricted access may be provided to the ports 110. In such examples, block 425 may be skipped.

If at block 425, it is ascertained that access to the port is restricted ('Yes' branch), the method 400 may proceed to block 430. At block 430, authentication information pertaining to the external device may be obtained. For instance, the controller 115 may obtain the authentication information from the device data 240.

At block 435, it is ascertained whether the external device is authenticated, based on the authentication information, to access the port. For instance, the controller 115 may compare the obtained authentication information with the authentication data 250.

In case the external device is authenticated ('Yes' branch), the method 400 may proceed to block 440. Further, if at block 425, it is ascertained the access to the port is not restricted ('No' branch), the method 400 may in that event as well proceed to block 440.

At block 440, an input may be provided to generate a magnetic field with attractive force at the port. In an example, the controller 115 may provide an input to the field generation unit 220 to generate the attractive magnetic field. Further, the attractive magnetic field may be generated, based on a connector pole of a magnetic component of the connector 120 of the external device 105.

However, if at block 435, the external device is not authenticated ('No' branch), the method 400 may proceed to block 445, where an input to generate a magnetic field with a repulsive force with respect to the connector of the external device may be provided. The repulsive force may prevent the connector 120 of the external device 105 from connecting to the port 110.

Figure 5:
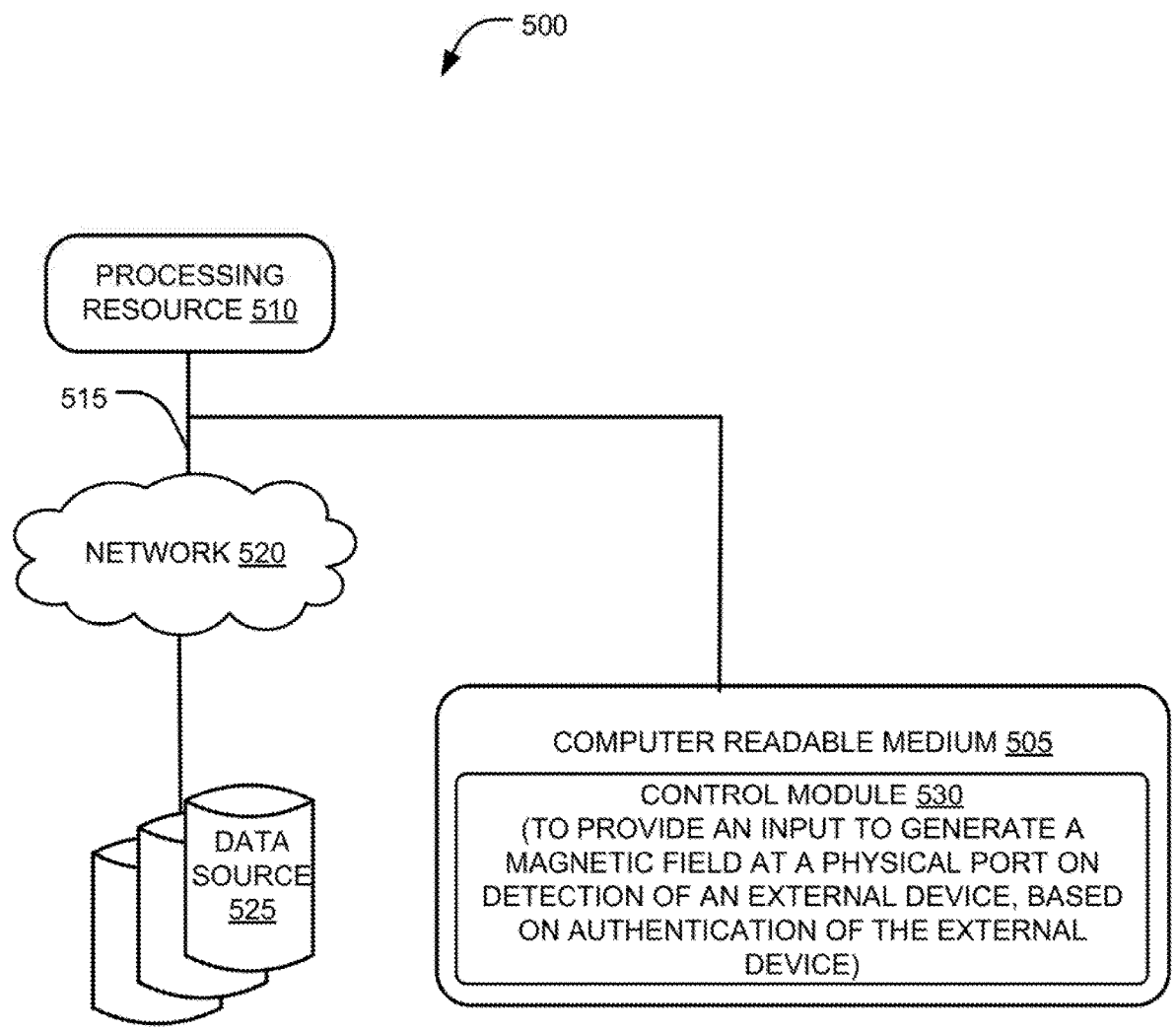
FIG. 5 illustrates a network environment to manage port of an electronic device; according to an example implementation of the present subject matter.

FIG. 5 illustrates an example network environment 500 using a non-transitory computer readable medium 505 for managing connectivity to ports of an electronic device, according to an example implementation of the present subject matter. The network environment 500 may be a public networking environment or a private networking environment. In one example, the network environment 500 includes a processing resource 510 communicatively coupled to the non-transitory computer readable medium 505 through a communication link 515.

For example, the processing resource 510 can be a processor of a computing system, such as the electronic device 100. The non-transitory computer readable medium 505 can be, for example, an internal memory device or an external memory device. In one example, the communication link 515 may be a direct communication link, such as one formed through a memory read/write interface. In another example, the communication link 515 may be an indirect communication link, such as one formed through a network interface. In such a case, the processing resource 510 can access the non-transitory computer readable medium 505 through a network 520. The network 520 may be a single network or a combination of multiple networks and may use a variety of communication protocols.

The processing resource 510 and the non-transitory computer readable medium 505 may also be communicatively coupled to data sources 525 over the network 520. The data sources 525 can include, for example, databases and computing devices. The data sources 525 may be used by the database administrators and other users to communicate with the processing resource 510.

In one example, the non-transitory computer readable medium 505 includes a set of computer readable instructions such as a control module 530. As would be understood, the control module 530 implements the functionality of the controller 115. The set of computer readable instructions, referred to as instructions hereinafter, can be accessed by the processing resource 510 through the communication link 515 and subsequently executed to perform acts for managing connectivity to ports of the electronic device 100.

For discussion purposes, the execution of the instructions by the processing resource 510 has been described with reference to various components introduced earlier with reference to the description of FIGS. 1-2.

On execution by the processing resource 510, the controller 115 may detect presence of an external device, such as the external device 105 within specific distance from the electronic device, i.e., in proximity of the electronic device 100. The controller 115 may detect the presence, based on receipt of device data from the transmitter 275 of the external device 105. The device data may be transmitted using a short range communication protocol. Further, the device data may include details pertaining to identity of the external device 105, a type of the external device, authentication details, or a combination thereof.

In response to detection of the external device 105, the controller 115 may provide control instructions to generate a magnetic field to manage the connectivity of the connector 120 of the external device 105 to the port 110. For instance, in case open access is not provided to the port 110, the magnetic field with attractive force may be generated on authentication of the external device. Further, in case of authentication failure, the magnetic field with the repulsive force may be generated with respect to the connector 120 to prevent unauthorized access to the electronic device 100.

Although examples for managing physical ports of electronic devices have been described in language specific to structural features and/or methods, it is to be understood that the appended claims are not limited to the specific features or methods described. Rather, the specific features and methods are disclosed as examples for managing the physical ports.

We claim:

1. An electronic device comprising:
   a physical port to receive a connector of an external device; and
   a controller to,
   detect presence of an external device within a specific distance, based on receipt of device data from the external device; and
   in response to detection, provide an input to generate a magnetic field at the physical port to manage connectivity of the connector of the external device to the physical port.

2. The electronic device as claimed in claim 1, wherein to provide the input to generate the magnetic field, the controller is to:
   authenticate the external device, based on authentication details in the device data; and
   when the external device is authenticated, provide the input to generate the magnetic field with an attractive force to facilitate coupling of the external device to the physical port.

3. The electronic device as claimed in claim 2, wherein the controller is to provide the input to generate the magnetic field with a repulsive force with respect to the connector, when the external device is not authenticated.

4. The electronic device as claimed in claim 1, wherein the electronic device comprises a transceiver coupled to the controller, and wherein the transceiver is to receive the device data using a short range communication protocol.

5. The electronic device as claimed in claim 1, wherein the electronic device comprises a field generation unit to generate the magnetic field, based on the input received from the controller.

6. The electronic device as claimed in claim 1, wherein the controller is to obtain aggregate data indicative of user behavior, user preferences, or a combination thereof.

7. The electronic device as claimed in claim 1, wherein the controller is to identify the physical port corresponding to the external device, based on the device data, the aggregate data, a user input, or a combination thereof, and wherein the device data includes an identity of the external device, a type of the external device, or a combination thereof.

8. A method comprising:
   receiving device data from an external device to detect presence of the external device within a specific distance from an electronic device; and
   providing an input to generate a magnetic field at a physical port of the electronic device to manage connectivity of a connector of the external device to the physical port.

9. The method as claimed in claim 8, wherein providing the input to generate the magnetic field is based on:
   authenticating the external device, based on authentication details in the device data; and
   when the external device is authenticated, providing the input to generate the magnetic field with an attractive force to facilitate coupling of the connector of the external device to the physical port.

10. The method as claimed in claim 9, wherein the method comprises providing the input to generate the magnetic field with a repulsive force with respect to the connector, when the external device is not authenticated.

11. The method as claimed in claim 8, wherein the method further comprises identifying, on detecting the external device, the physical port corresponding to the external device, based on the device data, aggregate data, a user input, or a combination thereof, the aggregate data being indicative of user behavior, user preferences, or a combination thereof.

12. The method as claimed in claim 8, wherein the method further comprises transmitting a polling signal using a short range communication protocol to detect the presence of the external device.

13. A non-transitory computer readable medium having a set of computer readable instructions that, when executed, cause a processor to:

detect presence of an external device within a specific distance of an electronic device, based on receipt of device data from the external device;

on detecting the external device, authenticate the external device, based on authentication details in the device data; and provide, based on the authentication, control instructions to generate a magnetic field at a physical port to manage connectivity of a connector of the external device to the physical port.

14. The computer readable medium as claimed in claim 13, wherein the computer readable instructions, when executed, further cause the processor to provide control instructions to generate the magnetic field with an attractive force to facilitate coupling of the connector of the external device to the physical port, when the external device is authenticated.

15. The computer readable medium as claimed in claim 13, wherein the computer readable instructions, when executed, further cause the processor to, identify, on detecting the external device, the physical port corresponding to the external device, based on the device data, aggregate data, a user input, or a combination thereof, and wherein the aggregate data is indicative of user behavior, user preferences, or a combination thereof.

* * * * *